(12) United States Patent
Ervin (10) Patent No.: US 6,575,869 B2
(45) Date of Patent: Jun. 10, 2003

(54) TRACTION-DRIVE, CONTINUOUSLY VARIABLE TRANSMISSION

(75) Inventor: James Douglas Ervin, Novi, MI (US)

(73) Assignee: Ford Global Technologies, LLC., Dearborn, MI (US)

( * ) Notice: Subject to any disclaimer, the term of this patent is extended or adjusted under 35 U.S.C. 154(b) by 63 days.

(21) Appl. No.: 09/753,696

(22) Filed: Jan. 3, 2001

(65) Prior Publication Data

US 2002/0128114 A1 Sep. 12, 2002

(51) Int. Cl.$^7$ ................................................ F16H 15/38
(52) U.S. Cl. ............................. 476/40; 476/42; 476/46
(58) Field of Search .............................. 476/40, 42, 44, 476/46

(56) References Cited

U.S. PATENT DOCUMENTS

| | | | | |
|---|---|---|---|---|
| 703,237 A | * | 6/1902 | Cowles | 476/40 |
| 1,904,046 A | * | 4/1933 | Hayes | 476/40 |
| 1,981,910 A | * | 11/1934 | Ehrlich | 476/42 |
| 2,057,136 A | * | 10/1936 | Criswell | 476/40 |
| 2,073,134 A | * | 3/1937 | Almen et al. | 476/44 |
| 2,124,398 A | * | 7/1938 | Hayes | 476/40 |
| 2,124,399 A | * | 7/1938 | Hayes | 476/42 |
| 2,126,772 A | * | 8/1938 | Haskell | 476/42 |
| 2,910,878 A | | 11/1959 | Erban | |
| 4,086,820 A | | 5/1978 | Kraus et al. | |
| 4,444,068 A | | 4/1984 | Kraus | |
| 4,453,427 A | | 6/1984 | Kraus et al. | |
| 5,052,236 A | | 10/1991 | Nakano | |
| 5,895,337 A | | 4/1999 | Fellows et al. | |

* cited by examiner

*Primary Examiner*—William C Joyce
(74) *Attorney, Agent, or Firm*—F. G. McKenzie (57) ABSTRACT

An infinitely variable traction drive variator comprising at least one pair of toroidal discs with torque-transmitting traction rollers situated between the discs. As one disc drives the other, the effective radius of the point of contact of the rollers on one disc is decreased and the effective radius of the point of contact of the rollers with the other disc increases. The rollers are rotatably mounted in a trunnion which is pivotally mounted on a gimbal frame, which in turn is pivotally mounted on a relatively stationary gimbal support. Provision is made for adjusting the angularity of the frame about the axis of the discs, thereby creating an angular offset for the rollers, which results in a change of the effective radius of the contact at each disc.

7 Claims, 11 Drawing Sheets

TRACTION-DRIVE, CONTINUOUSLY VARIABLE TRANSMISSION

BACKGROUND OF THE INVENTION

1. Field of the Invention

The invention relates to a traction drive having infinitely variable ratio characteristics, the traction drive including torque-transmitting discs forming a torque flow path between a driving shaft and a driven shaft.

2. Background Art

In a transmission mechanism with continuously variable torque ratio characteristics, the overall torque ratio may be changed without the usual shift between defined torque ratios. This will provide a lower engine speed for a given power output when the transmission mechanism is used in an engine-driven automotive vehicle driveline. Throttle losses are reduced and the engine operates close to its minimum brake specific fuel consumption point.

It is known design practice to achieve a relatively high torque-transmitting capacity in a continuously variable transmission environment by using toroidal discs as part of a traction drive. Torque-transmitting rollers are in engagement with the toroidal discs in a lubricated contact patch. The torque capacity that can be achieved exceeds the usual torque capacity of other well known continuously variable transmissions, such as belt and pulley assemblies wherein the radius of the contact of the belt with each pulley changes as the effective pitch diameter of the pulley is adjusted.

In the case of a toroidal traction drive, torque transfer through the rollers between the discs occurs through the lubricated contact patch by relying on shear forces at the interface of the rollers and the discs. An example of a toroidal drive of this kind can be seen by referring to U.S. Pat. No. 5,052,236, which discloses a traction drive in which two pairs of discs are used in a parallel torque flow arrangement, thereby increasing the torque-transmitting capacity by a factor of two compared to a traction drive with one pair of discs. Another example of an earlier traction drive design may be seen by referring to copending U.S. patent application Ser. No. 09/753,696, filed Jan. 3, 2001, entitled "Control System for a Continuously Variable Traction Drive", Attorney Docket No. FMC 1120 PUS. This copending patent application is assigned to the assignee of the present invention.

In the traction drives disclosed in the copending application and in the '236 patent, the transmission ratio is controlled by adjusting the rotary axis of each roller relative to the rotary axis of the discs. This creates a misalignment of the tangential force vectors from the rolling elements across the contact patch and produces a force vector component of the tangential force, which creates a roller tilting moment. This tilting moment adjusts the angularity of the rollers to change the transmission ratio.

When torque is transmitted through a traction drive transmission, control pistons of a hydraulic ratio control system provide a reaction force to the rollers to maintain their position. Reaction forces for these prior designs are relatively high, which requires a control effort that is difficult to achieve. In a typical automotive vehicle driveline using such a traction drive, the reaction force that must be accommodated by the hydraulic control system can easily exceed 5000N/roller. This high force creates a design challenge because of the sensitivity of the relationship between transmission ratio and the hydraulic pressure acting on hydraulic control pistons.

In the prior traction drive designs, power is transferred from an input disc through the rollers to an output disc across a traction fluid medium in a contact patch. The discs rotate in opposite directions about a common axis. The rollers are supported by trunnions on a trunnion frame. The transmission ratio is changed as the effective torque input radius and the effective torque output radius at the contact patches for the discs are changed due to an adjustment of the roller orientation created by laterally offsetting the roller axis relative to the disc axis. A steering moment created by the offset is generated to force the rollers to tilt to a new ratio. When that ratio is achieved, the offset is eliminated and the force component creating a tilting moment returns to zero. The new position of the rollers must be held accurately, however, so that the tilting moments on the rollers do not exceed the friction in the trunnion bearings. Furthermore, the high hydraulic control forces required make it difficult to package the hydraulic control elements in an assembly that would be practical for use in a commercial driveline. For this reason, traction drives typically are limited to two rollers for each pair of discs. This essentially limits the torque capacity of the driveline.

SUMMARY OF THE INVENTION

It is an objective of the invention to provide a traction drive in which ratio changes in a ratio variator can be achieved without displacing the axis of the rollers laterally relative to the axis of the discs. This is accomplished by angularly offsetting the roller trunnions about a gimbal axis parallel to the disc axis, which creates a steering moment that adjusts the inclination of the rollers. This isolates the control effort for controlling the inclination of the rollers about the gimbal axis from the load-bearing requirements that are typical of the traction control of the prior designs. It also substantially reduces the control effort relative to the control effort typical of the prior designs. Further, a so-called master roller may be controlled while driving a number of slave rollers through steering synchronization mechanisms. In this way, the rollers can readily be packaged in a group of three within each toroidal cavity created by the pairs of discs. This results in a 50% increase in torque capacity with little weight penalty, if any, compared to a design with one roller pair.

It is an additional objective to eliminate the need for dealing with the high gimbal control forces typical of the prior designs, thereby increasing the stability of the system and improving the response of the traction drive to the ratio control effort.

It is an objective also to support the trunnion by a gimbal frame whereby the torque reaction forces are transmitted to a gimbal frame rather than to a yoke and piston mechanism typical of the prior designs. The frame can be inclined about a pivot axis that passes through two fixed gimbal supports.

The trunnion is adjusted by a control cam or by other suitable control elements in a direction transverse to the direction of the disc axis. This inclines the gimbal frame, thereby producing an angular offset of the rollers. This offset generates a moment to produce a change in ratio. Thus, control forces are essentially decoupled from the force that is required to support the rollers.

It is a further objective to provide a traction control system having a single control mechanism associated with a so-called master roller and to use a number of slave rollers with a steering synchronization mechanism. This makes it possible to package three rollers between each pair of discs, as mentioned above, to improve the torque-transmitting capacity of the traction drive. The tilting of one roller is accompanied by corresponding tilting of the companion rollers because of the action of the steering synchronization mechanism.

BRIEF DESCRIPTION OF THE DRAWINGS

FIG. 20 is a schematic illustration of the bevel gear ratio synchronizing arrangement of FIG. 19;

FIGS. 20a and 20b are schematic views showing the geometry of the bevel gear teeth when provision is made for backlash reduction in the gear ratio synchronizer of FIG. 19 and FIG. 19a.

DETAILED DESCRIPTION OF THE PREFERRED EMBODIMENT(S)

For the purpose of describing the structure and function of the angular offset traction drive of the present invention, reference will be made to FIGS. 1, 1a, 2, 3 and 3a, which illustrate the Y offset design approach disclosed in the copending patent application previously identified. As in the case of the Y offset traction drive of the copending application, the continuously variable transmission of the present invention provides improved fuel economy and smooth operation as the transmission ratio varies throughout a continuum of ratios in a broad ratio range.

The Y offset traction drive comprises two half toroidal discs 10 and 12. A pair of rollers is situated in the toroidal cavities defined by the juxtaposed toroidal surfaces of the discs 10 and 12, as shown at 14 and 16. These rollers are journalled for rotation about their axes, the axis for the roller 16 being shown at 18. Each roller is rotatably supported in a trunnion, the trunnion for roller 14 being shown at 20, and the corresponding trunnion for roller 16 being shown at 22. Each trunnion 20 and 22 is joined to a yoke 24 with an articulated connection. The yoke 24 has a pivot axis for limited oscillation, as shown at 26 in FIG. 1.

Figure 1:
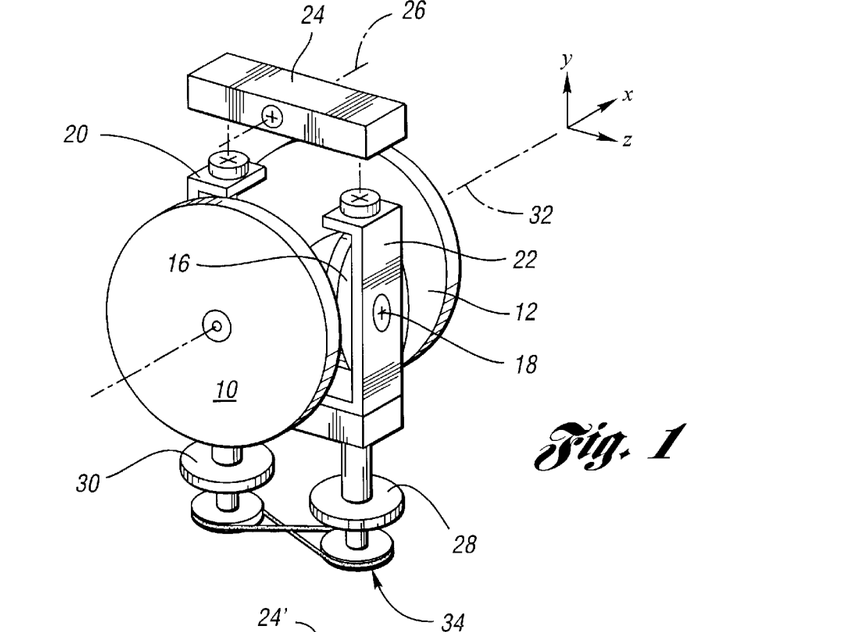
FIG. 1 is an isometric schematic view of a traction drive variator of the earlier designs previously described.

A Y offset control piston 28 is directly connected to the trunnion 22. A corresponding Y offset control piston 30 is connected to trunnion 20.

The axis of the discs 10 and 12 is shown in FIG. 1 at 32. Cartesian coordinates for the axes are identified in FIG. 1 and in FIG. 1a to designate the X axis direction, the Y axis direction and the Z axis direction.

Figure 1A:
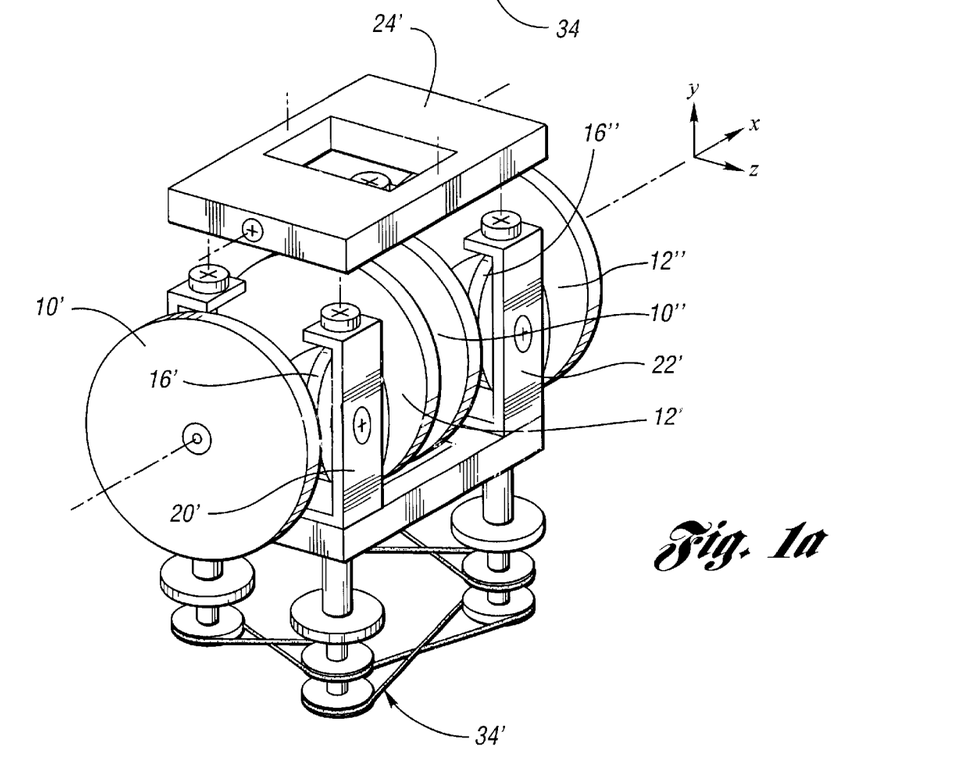
FIG. 1a is an isometric schematic view of a transmission that uses two pairs of discs rather than the single pair illustrated in FIG. 1.

A cable and pulley mechanism for ratio synchronization is shown in FIG. 1a at 34. It comprises pulleys that are connected to the piston shafts for the control pistons 28 and 30. Angular adjustment of the trunnions 20' and 22' about the axis of the respective piston shafts 30 and 28 occurs in tandem, adjustment of one trunnion thereby being equal to adjustment of the other trunnion.

The Y offset traction control design of FIG. 1a has two toroidal cavities defined by toroidal discs 10' and 12' at one side of the assembly and by toroidal discs 10" and 12" at the other side of the assembly. Rollers 16' and 16" are situated in the toroidal cavity defined by the discs 10' and 12' and by the discs 10" and 12", respectively. A yoke 24', which corresponds to the yoke 24 illustrated in FIG. 1, is connected to each trunnion 22' and 20' with an articulated connection. A cable and pulley system, shown at 34', ensures that angular adjustment of each trunnion about its trunnion axis will be uniform, angular adjustment of one trunnion being equal to the angular adjustment of the companion trunnions.

Figure 2:
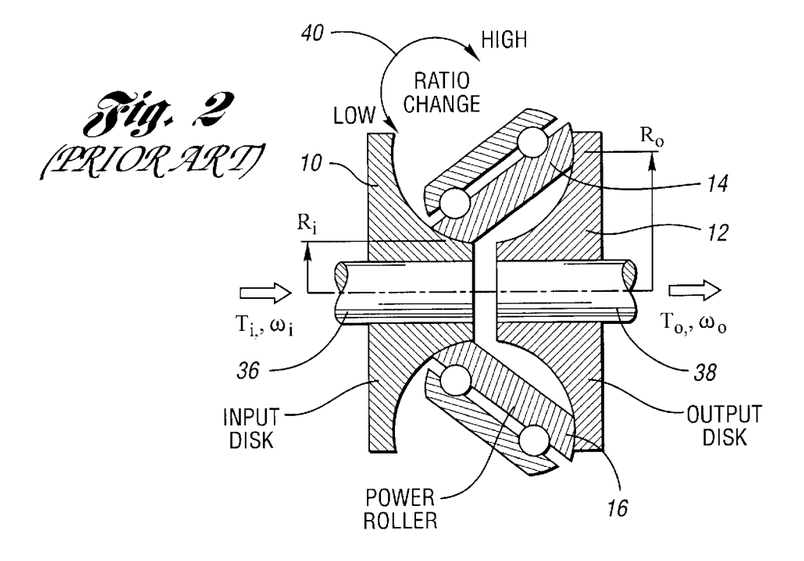
FIG. 2 is a schematic representation of prior traction drive designs showing a pair of toroidal discs and an intermediate pair of traction rollers or power rollers.

FIG. 2 shows schematically a torque input shaft 36 and a torque output shaft 38. The roller 14 engages the toroidal surface of the disc 10 at a radius $R_i$, and the disc 12 is engaged by the roller 14 at a radius $R_o$. The gear ratio created by the mechanism, when the rollers assume the position in FIG. 2, is equal to $R_o \div R_i$. The ratio changes when the rollers tilt in the direction of the directional arrow 40. The rollers engage the toroidal surfaces of the discs at a contact patch that will be described subsequently.

Torque is transferred from the input shaft 36 to the output shaft 38 as tangential force components at the contact patch act at their respective moment arms $R_i$ and $R_o$. Power is transferred from the input disc through the rollers to the output disc through the rolling contact patches across a traction fluid medium. When the ratio is changed by offsetting the rollers in the Y axis direction relative to the discs, seen in the schematic view of FIG. 3, a steering moment is generated, which causes the trunnion and the roller to swing to a new ratio. When the desired ratio is achieved, the Y offset is removed and the steering moment returns to zero. At that time, the ratio will be held stable, provided the Y axis position of the roller is held accurately enough so that the steering moments do not exceed the friction of the trunnion bearings.

In the designs of FIG. 1 and FIG. 1a, the Y offset adjustment is achieved by a hydraulic piston, which maintains the Y position of the rollers. The Y position force must be great enough to accommodate the torque being transferred. The control effort can be very high, which requires control elements that are large and difficult to package. Because of space limitations, Y offset designs of this type are limited to two rollers per cavity. This, in turn, limits the torque capacity of the transmission.

Figure 3:
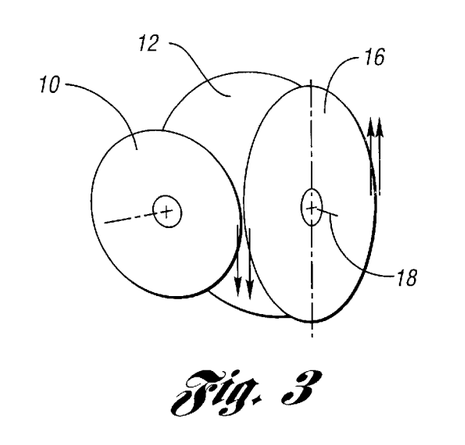
FIG. 3 is a schematic view of a roller situated between a power input disc and a power output disc together with parallel tangential force vectors, which exist when there is no steering vector force component.
Figure 3A:
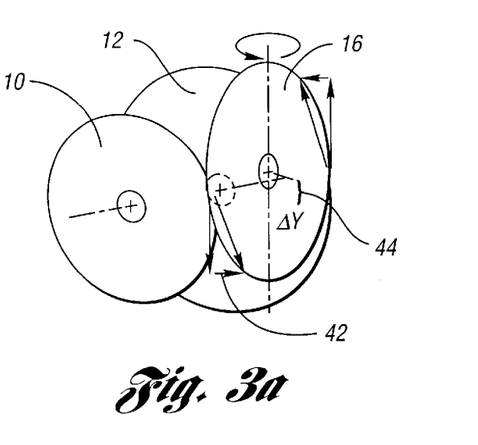
FIG. 3a is a schematic diagram of the prior design previously discussed wherein an offset of the roller axis relative to the axis of the disc produces steering about the trunnion axis.
Figure 3B:
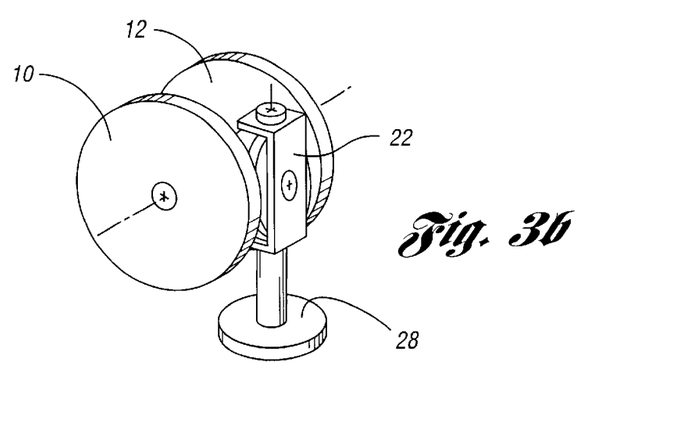
FIG. 3b is a schematic diagram of the roller and disc arrangement of FIG. 3a together with a control piston.
Figure 4:
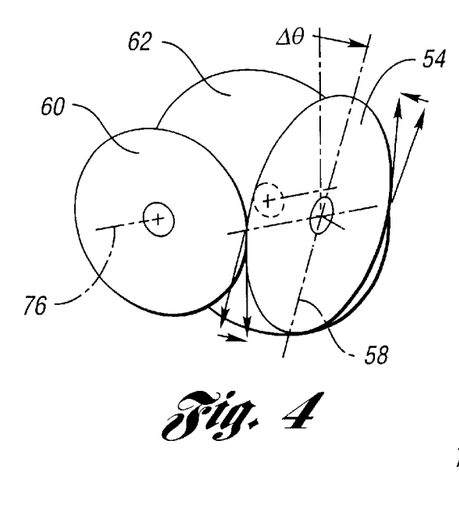
FIG. 4 is a schematic representation of the disc and roller assembly of the invention.
Figure 4A:
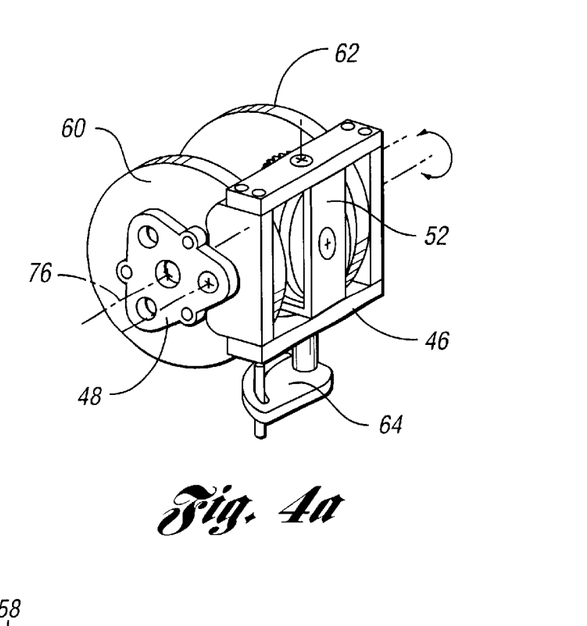
FIG. 4a is a schematic representation of the disc and roller arrangement of FIG. 4 together with the gimbal axis adjustment mechanism.

FIG. 3 shows the velocity vectors at the contact points when the mechanism is in a stable state with no steering vector. When the trunnion 22 is offset by the piston 28, as seen in FIG. 3b, a steering component is developed, as shown at 42. The amount of the offset for the roller 14 relative to the axis of the discs 10 and 12 is indicated at 44.

Figure 5:
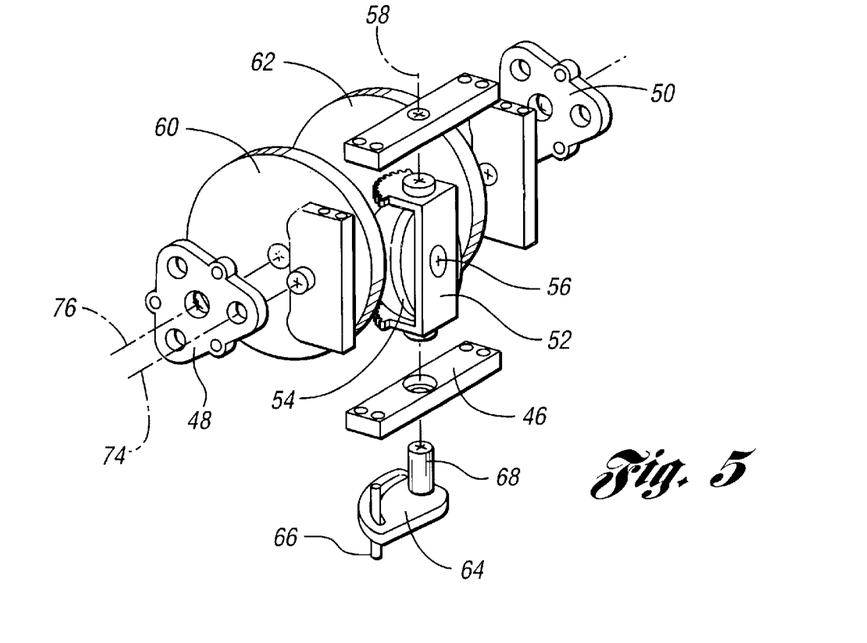
FIG. 5 is an isometric schematic view of the roller and disc arrangement of FIG. 4 showing the angular offset components for one roller.

In contrast to the Y axis offset design, the angular offset design of the present invention makes it possible to increase the torque capacity of the half toroidal discs since the design permits the packaging of three rollers per cavity rather than two. Although the angular offset design transmits power using the same disc and roller arrangement as the Y offset design, the trunnion is supported by a gimbal frame 46, as indicated in FIG. 5, instead of a yoke and piston mechanism, as in the Y offset design. The gimbal frame is free to pivot about a pivot axis passing through two fixed gimbal supports shown at 48 and 50.

The angular offset design of the present invention, which is schematically illustrated in FIG. 5, includes a trunnion 52 and a roller 54. The trunnion rotatably supports the roller 54 about roller axis 56. The trunnion is pivotally supported by the gimbal frame 46 on gimbal axis 58. Roller 54 engages the toroidal surface of the toroidal discs 60 and 62. The gimbal frame replaces the yoke of the Y axis offset design by supporting the trunnion 52 in the X axis and Z axis directions, and replaces the piston by providing support in the Y direction. The control mechanism of FIG. 5 includes a control cam 64 and a control post 66 received in a cam slot, as shown in FIG. 5. The control cam is connected directly to the trunnion shaft 68 and rotates with the trunnion 52. When the control cam 68 is adjusted, the gimbal frame 46 is inclined, thereby producing an angular offset for the rollers 54.

Figure 6:
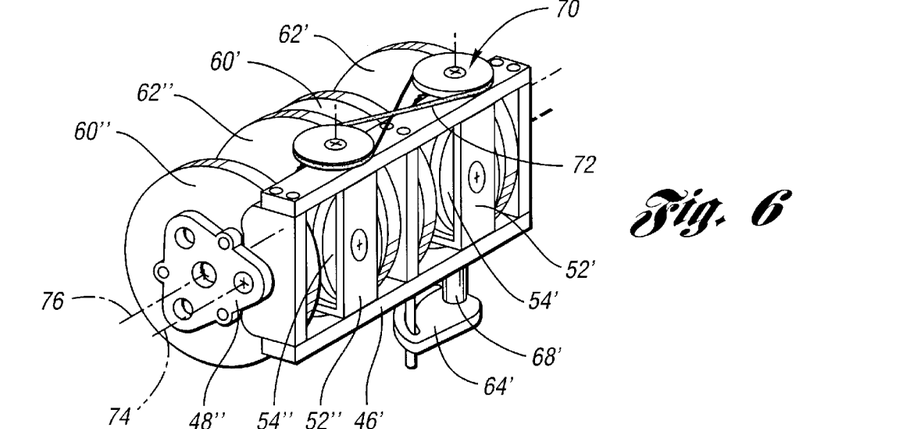
FIG. 6 is a partial isometric, schematic view of a traction drive using angular offset rollers arranged in tandem with two pairs of discs.

FIG. 6 shows a partial assembly of a traction drive that has two pairs of toroidal discs. FIG. 6 is a partial assembly view with a first pair of discs 60' and 62' and a second pair of discs 60" and 62". The pair of discs shown at 60' and 62' enclose roller 54', which is rotatably supported in trunnion 52'. Similarly, rollers 54" engage the other pair of discs 60" and 62". Rollers 54" are journalled on trunnion 52". Both trunnions 52" and 52' are journalled on gimbal frame 46'. Control cam 64, which is secured to gimbal shaft 68, adjusts the angular disposition of the trunnion 52', which results in tilting of the roller 54'. A synchronizer mechanism 70, which functions in a manner similar to the synchronizer mechanism 34 shown in FIG. 1, comprises a pair of pulleys interconnected by a cable 72, which ensures that the motion of the rollers 54' will be duplicated by the motion of the rollers 54".

Figure 6A:
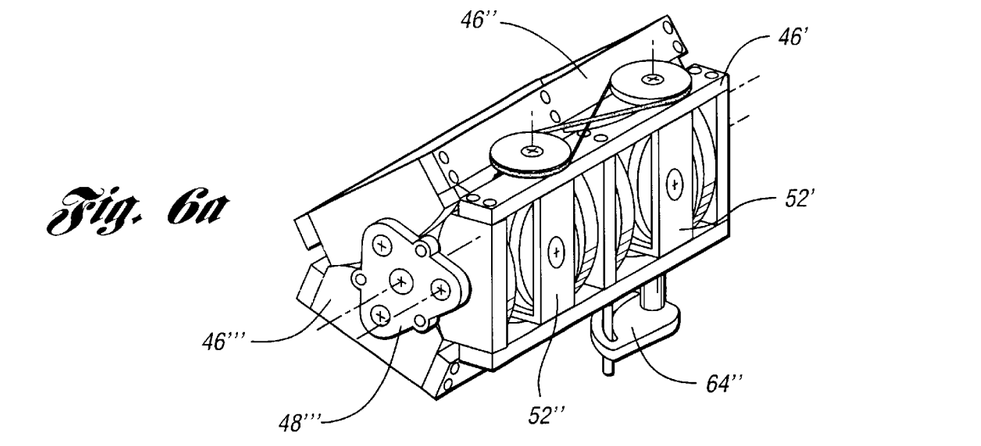
FIG. 6a is a view similar to FIG. 6, although three gimbal supports for the rollers are illustrated.

FIG. 6a is an isometric view that shows three of the partial assembly elements of FIG. 6, each of the three partial assembly views being joined in angular disposition at 120° intervals. The frame 46' has corresponding frames 46" and 46'", as shown in FIG. 6a. The frames are rotatably supported in gimbal supports 48'", which corresponds to the gimbal support 48" of FIG. 6. Trunnion 52' has corresponding trunnions at 52a' and 52b' in FIG. 6b.

Figure 6B:
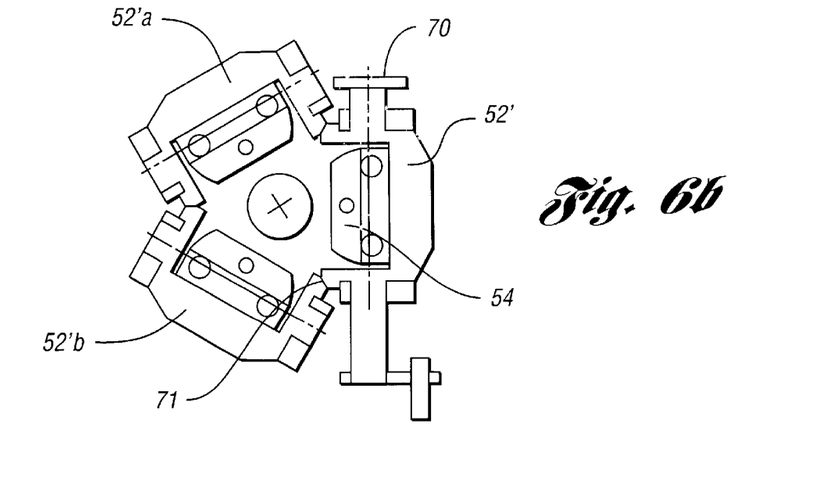
FIG. 6b is a view of the three rollers used in the assembly of FIGS. 6 and 6a, one roller being the master roller, and the other two being slave rollers.

FIG. 6b is an end view of the structure shown in FIG. 6a. It shows trunnion gimbal 52' and corresponding trunnions 52a' and 52b' with meshing helical gears at 71. As one gimbal rotates on its axis, the helical gear connection between the trunnions will cause the trunnions 52'" and 52' to oscillate in synchronism with trunnion 52'. Thus, as the control cam 64 is adjusted, each of the trunnions will move in unison to achieve ratio synchronization.

Moving the control post 66 adjusts the gimbal 52 in the arrangement of FIG. 5 as the control cam 64 is angularly adjusted. The post 66 is moved in the Z axis direction. This inclines the frame 46, thereby producing an angular offset of the roller 54, which generates a steering moment to produce a change in ratio. The control forces for the control cam and the control post are essentially decoupled from the force required to support the rollers, which is in contrast to the Y offset design. The control force requirements may be reduced by factor of 100. Adjustment of a single master roller thus can be used to control the other two slave rollers in each of the toroidal cavities.

Figure 7:
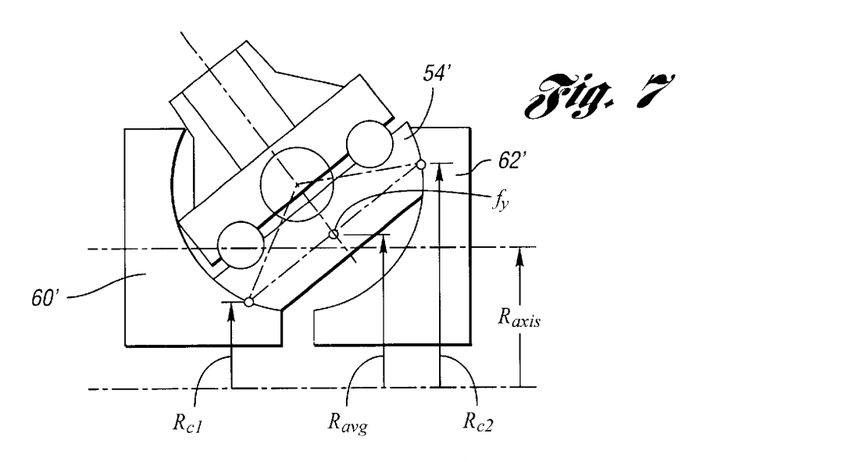
FIG. 7 is a schematic view of the angular offset assembly of FIG. 5, which shows the resultant contact force vector and the radii of the contact patches between the roller and the discs.
Figure 7A:
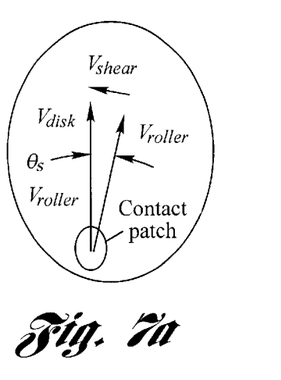
FIG. 7a is a representation of the velocity vector components for an element in the contact patch between the discs and the rollers.
Figure 7B:
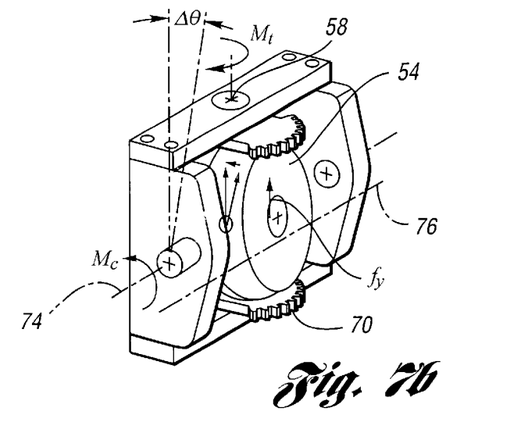
FIG. 7b is a partial view of the angular offset assembly of FIG. 6 together with force and velocity vector components for the angular offset design of the invention.

As in the case of the Y offset design, the angular offset traction control changes ratio when the steering moment $M_r$, seen in FIG. 7b, is generated about the trunnion axis 58 due to the steering angle $\theta_s$ seen in FIG. 7a. FIG. 7a is an enlarged view of the contact patch at the engagement of roller 54 with the adjacent disc 60 in the case of FIG. 5 or the disc 60' in the case of FIG. 6. The velocity vector in the contact patch for a particle of lubricating fluid for the disc is offset relative to the velocity vector for the same particle of lubricating fluid at the roller. The angular relative disposition of the vectors, which is the steering angle $\theta_s$, develops a velocity vector $V_{shear}$.

The steering angle in the case of the angular offset design is generated by inclining the roller 54 about the gimbal axis 74, which is parallel to the disc axis 76 as seen in FIG. 7b. It is this inclination that generates the steering angle between the tangential velocity vector of the disc and the tangential velocity vector of the roller seen in FIG. 7a. The steering angle produces shear forces in the traction fluid transverse to the velocity tangent and generates a steering moment that moves the trunnion and the roller 54 to a new ratio. When the desired ratio is achieved, the angular offset is eliminated and the steering moment returns to zero. That ratio is maintained provided that the angular position of the roller is held accurately enough so that the steering does not exceed the friction in the trunnion bearings. If it is assumed that the tilting angle is small, the steering angle $\theta_s$ can be approximated as follows:

$$\theta_s = \Delta\theta + \tan^{-1}\left[\frac{\sin(\Delta\theta)(R_{axis} - R_c)}{R_c}\right]$$

In the preceding equation, $\Delta\theta$ is the angular offset, as seen in FIG. 7b, $R_c$, is the radius from the disc centerline to the point of contact under consideration, as seen in FIG. 7, and $R_{axis}$ is the radius from the disc centerline to the gimbal axis, as seen in FIG. 7. If the gimbal axis and the disc axis are coincident (i.e., $R_{axis}$=0), the preceding equation indicates that the steering angle is zero for any given angular offset [$\tan^{-1}(\sin(\Delta\theta)) \cong \Delta\theta$ for small angles]. Conversely, non-zero steering angles can be achieved as the gimbal axis is moved away from the disc axis. The location of the gimbal axis, therefore, plays a role in determining the magnitude of the steering angle and the resulting moment that is achieved for a given angular offset.

In FIG. 7b, the discs are not illustrated since they would obscure the view of the rollers.

Although the location of the gimbal axis affects steering, it also affects the control moment required to control inclination of the gimbal. This control moment, seen at $M_c$ in FIG. 7b, occurs when the net contact force ($F_y$) in the Y direction acts along a line that is offset from the gimbal axis, as seen in FIG. 7.

Figure 8:
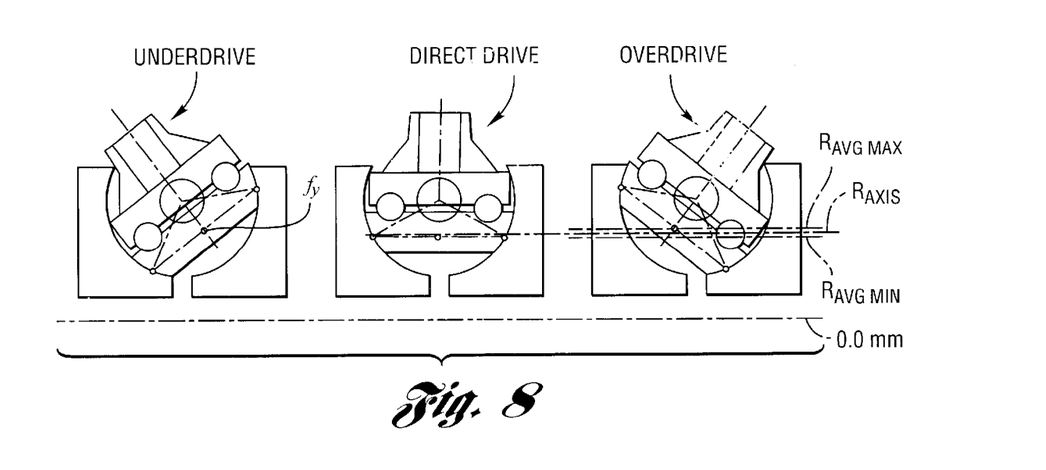
FIG. 8 is a schematic illustration of the variation of the location of $F_y$ relative to the disc axis.
Figure 9:
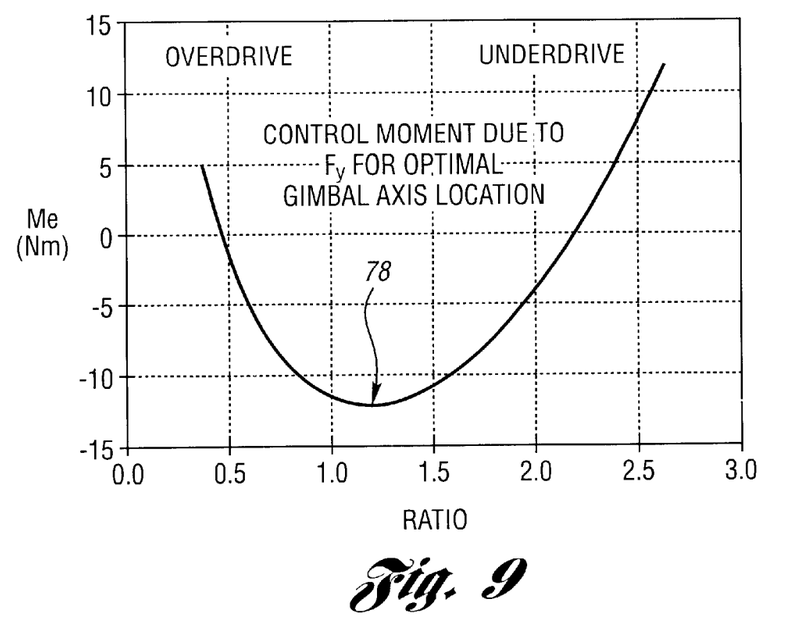
FIG. 9 is a plot of the variation of the control moment versus ratio for the angular offset design of the invention.

The value for $M_c$ is expressed as: $M_c = F_y(R_{axis} - R_{avg})$, where $R_{avg}$ is the average radius of contact. Although it is seen from the preceding equation that $M_c$ is zero whenever $R_{axis} = R_{avg}$, this condition cannot be achieved using a fixed gimbal axis because $R_{avg}$ changes as a function of ratio. This is demonstrated in FIG. 8, which is a schematic illustration of the variation in $R_{avg}$ for an underdrive ratio, a direct-drive ratio, and an overdrive ratio. That variation in $M_c$ as a function of ratio (holding input torque constant), however, can be minimized by locating the gimbal axis at an optimum location. The variation in $M_c$ is minimized when, in one example of the angular offset traction drive design, $R_{axis}$= 57.6 mm. If the torque input per roller is 105 Nm over a ratio range of 0.37 to 2.64, $M_c$ ranges from ±12 Nm, as seen in FIG. 9. The optimal axis location in this particular example is not directly at the midpoint of the range of $R_{avg}$ because $F_y$ changes as a function of ratio. By locating the gimbal axis at the radius having a minimum variation in $M_c$, the control effort is effectively decoupled from the support requirements at the gimbal frame. In this manner, the angular offset control system needs only to provide a modest control effort.

In the particular embodiment herein described, a control force of ±68 Nm at a radius of 175 mm would be needed for angular offset control, which is in contrast to a control force about ±6400 N for a traction drive using the prior Y offset design.

Figure 10:
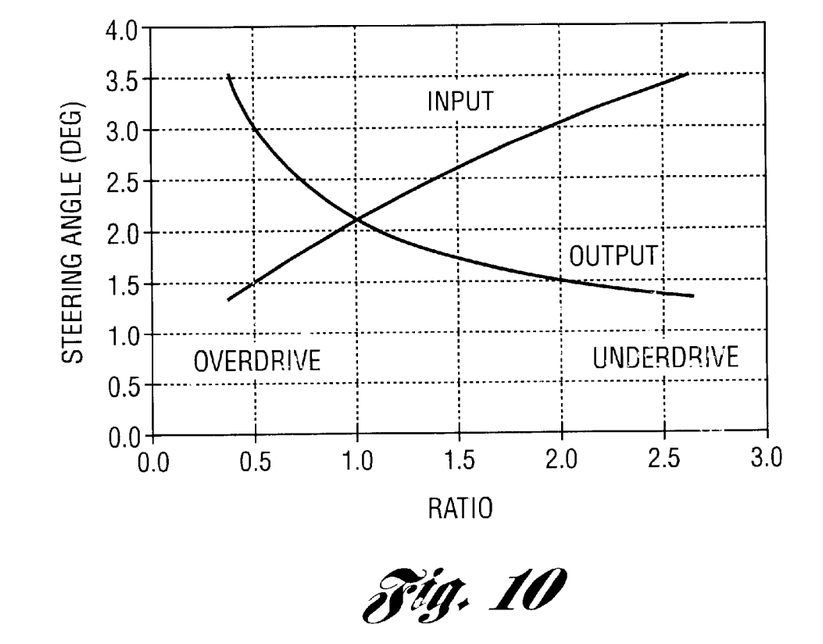
FIG. 10 is a plot of steering angle versus ratio for a two-millimeter offset of the roller axis relative to the disc axis for the prior design previously described, or a 2° offset of the gimbal axis for the angular offset design of the invention.

Although the angular offset geometry in the design of the present invention can be configured to generate steering, the resulting steering angles are the same as those that would be produced using the Y offset control input. For example, FIG. 10 shows steering angles for an angular offset design with optimal gimbal axis placement and steering angles for a corresponding Y offset design. The steering angles at points of contact were compared using a 2° inclination of the gimbal in one case and a 2 mm Y offset in the other case. Under these conditions, the steering angles at the input and output points of contact were indiscernible as indicated in FIG. 10. The angular offset design, therefore, can generate the same steering angles as the Y offset design.

Figure 11:
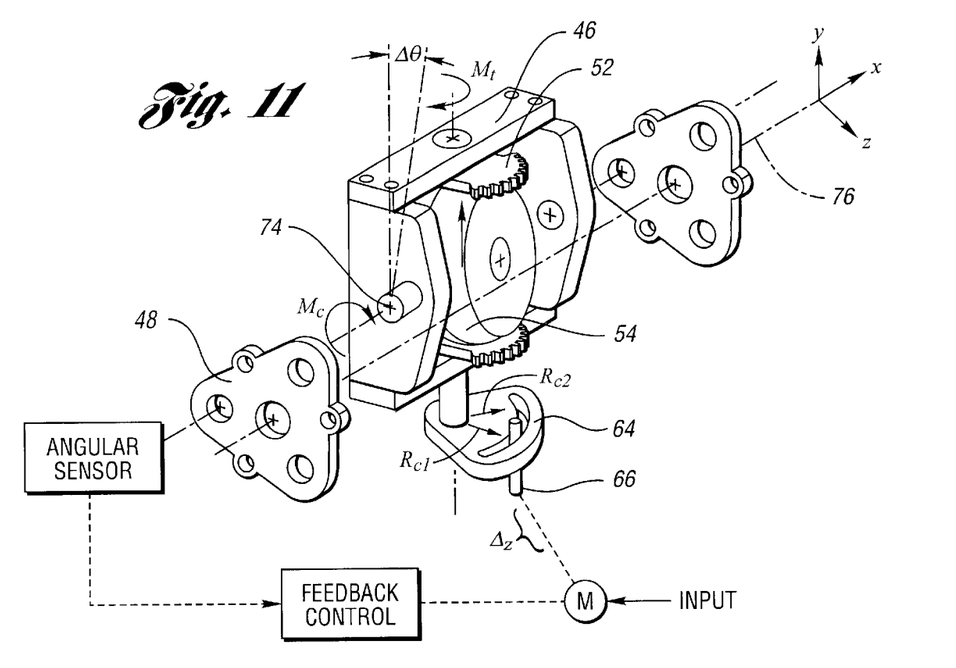
FIG. 11 is an isometric schematic view of the angular offset design of the present invention showing the gimbal inclined to produce a steering angle and a control cam for changing the inclination of the gimbal.

Because the angular offset design uses a different mechanism to generate steering compared to the Y offset design, the control elements are greatly simplified. The control system should develop a control input motion to change ratio with smoothness and stability, as shown in FIG. 11, where the gimbal control actuator $\mu$ adjusts post 66 in the Z axis direction. This is done by a control system in which rotation of the trunnion is used as feedback to control the inclination of the gimbal. As the gimbal is declined, the steering moment is generated as previously explained. In response to the tilting movement, the trunnion rotates to a desired ratio while a feedback mechanism removes the angular offset such that no steering moment is generated and the trunnion becomes stable at its new position.

Adjustment or tilting of the gimbal can be achieved by control cam 64, seen in FIG. 11, as well as in FIGS. 6 and 6a. As previously explained, the control cam is activated by a control post 66 with a displacement shown in FIG. 11 at $\Delta_z$, which produces an angular offset $\Delta\theta$. This produces a steering moment, identified by symbol $M_t$, which rotates the trunnion. As the trunnion rotates, the effective radius of the cam changes. At the position where $R_{2c}=R_{c1}-\Delta_z$, the angular offset is returned to zero, and the resulting steering moment is eliminated such that the trunnion becomes stable at the new ratio.

In the event of an overshoot, an opposite steering moment is generated, which attempts to return the trunnion to the original condition ($R_{c2}=R_{c1}-\Delta_z$). These various positions of the control cam are shown in FIG. 12.

Figure 12:
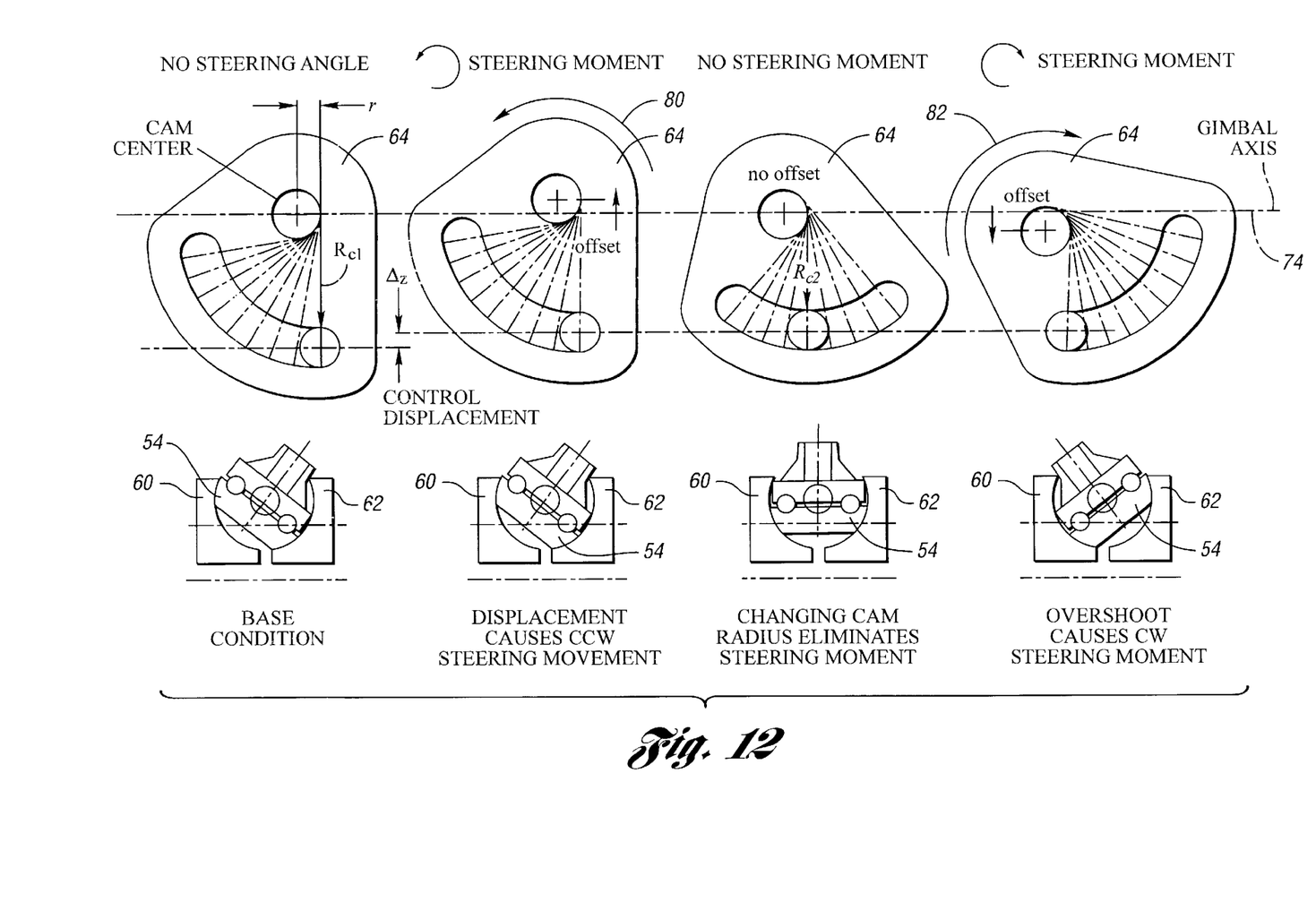
FIG. 12 shows schematic views of the cam arrangement for achieving the angular adjustment of the gimbal illustrated in FIG. 10.

In FIG. 12, the control cam shown in the left view represents the base condition where no steering angle is developed. In the second view from the left in FIG. 12, there is an offset due to the control displacement $\Delta_z$. That control displacement causes a counterclockwise steering moment, as shown at 80. When there is no offset as shown in the third view of FIG. 12, there is no steering moment. In the fourth view of FIG. 12, the offset is in the opposite direction, which creates a steering moment in the opposite direction, which is a so-called overshoot.

Although the cam design of FIG. 12 can be used, various other cam designs and profiles could be used, as well as other types of actuators, depending upon the design requirements. The particular actuator design that would be chosen should minimize sensitivity to position error of the control post or to alteration of the control gain as a function of ratio. For example, an involute circular cam could provide a linear gain (a change in trunnion angle) as a function of control displacement while maintaining a constant radius of action r, as seen in the left view of FIG. 12 for the control force.

If the control post and cam arrangement herein disclosed is used, the control cam would incline relative to the post about the gimbal axis (e.g., about ±2°). To provide this freedom, additional clearance can be added to the slot through which the control post extends, or the control post can be designed with a spherical tip.

Figure 13:
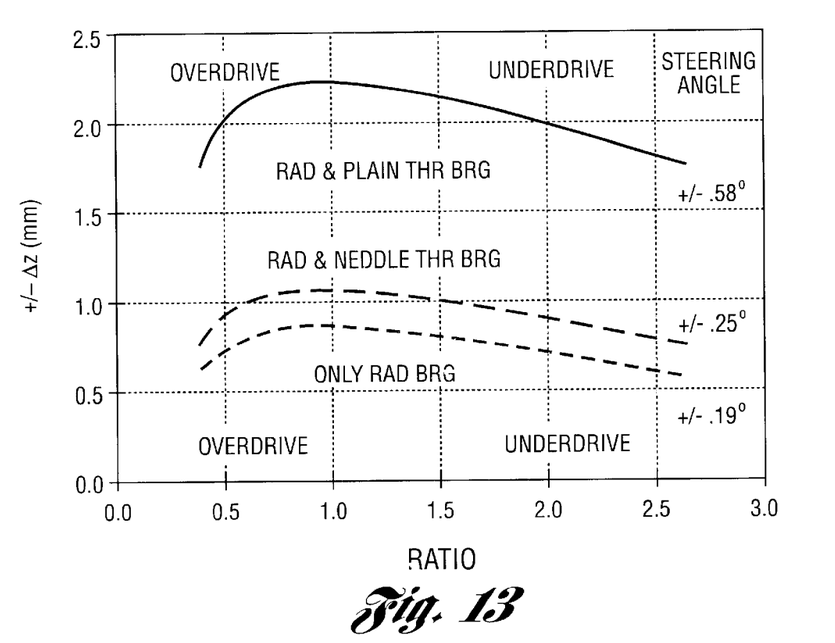
FIG. 13 is a plot showing a comparison of the control stability of the angular offset design of the invention for various bearing combinations.

Although cams such as a circular involute cam can provide an equilibrium position for a given control input, it is the friction in the trunnion bearings that prevents angular perturbation of the gimbal about an equilibrium point. The inclination point of the gimbal must be controlled more precisely when less bearing friction is present. FIG. 13 shows the effect of friction on gimbal inclination. The gimbal inclination must be maintained within ±0.19° if only a radial bearing is used, as shown at 82. A gimbal inclination of ±0.25° could be tolerated without ratio change if a radial and needle thrust bearing is used as shown at 84. If a plain bearing, such as a Teflon-coated stud, were to be substituted for the needle bearing, a gimbai inclination of ±0.58° could be tolerated, as shown at 86.

As the bearing friction increases, the sensitivity to angular perturbation is reduced. The presence of such trunnion friction reduces sensitivity to angular perturbations but increases the probability that the steering angle would be displaced from zero, which would reduce the efficiency of the drive. To minimize this probability, the control post could be commanded to return the inclination angle to zero whenever the desired ratio has been reached. This would require a feedback for the control. The feedback could be provided by mounting an angular sensor between the gimbal and the gimbal support.

The cam shown in FIG. 11 generates a stabilizing steering moment for one direction of rotation for inputs. In the opposite rotational direction, the steering moments would be opposite, thereby making the cam unstable. Accordingly, the proposed cam control is only intended for forward operation. Reverse ratio may be maintained by locking the trunnions in a low gear ratio. The trunnions could be locked using a number of conventional devices including clutches, brakes and engagement pins. If variable ratio is desired in reverse, the control post could be shuttled to disengage a forward control cam and to engage a reverse control cam of opposite curvature.

Although a cam control is disclosed, alternative controls also may be used, such as a cable drum assembly or a rack-and-pinion assembly.

As previously indicated, a single gimbal in a three-gimbal drive can act as a master control as the other two gimbals are adjusted as slave gimbals. Each of the rollers for each set of discs ideally should receive the same steering input, exhibit the same steering rate and settle at the same ratio to operate at maximum efficiency. Subtle manufacturing variations and variations in loading, however, may result in transmission ratios for each roller that are not matched from one roller to the next. When the ratios of the rollers are not well matched, additional slip occurs at the roller and disc interface, thus reducing transmission efficiency and possibly damaging the rolling elements. In order to ensure that each roller operates at the same ratio, the rollers are synchronized to produce synchronized steering and effective ratios for each roller.

Figure 14:
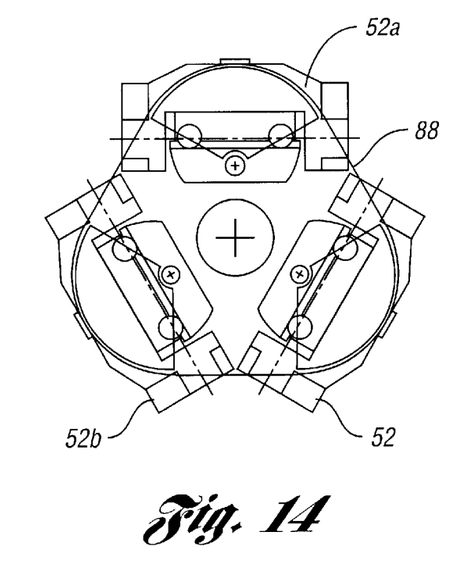
FIG. 14 shows schematically a cable arrangement for synchronizing the steering of the gimbals for each of three roller assemblies of the angular offset design.
Figure 15:
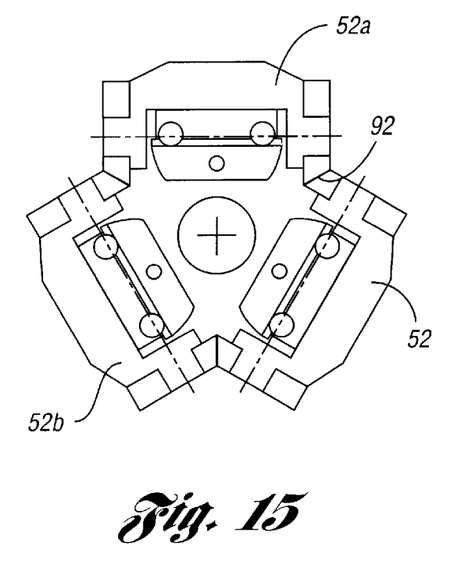
FIG. 15 shows a cam arrangement for synchronizing the steering of the gimbals for the rollers of the angular offset design of the invention.
Figure 16:
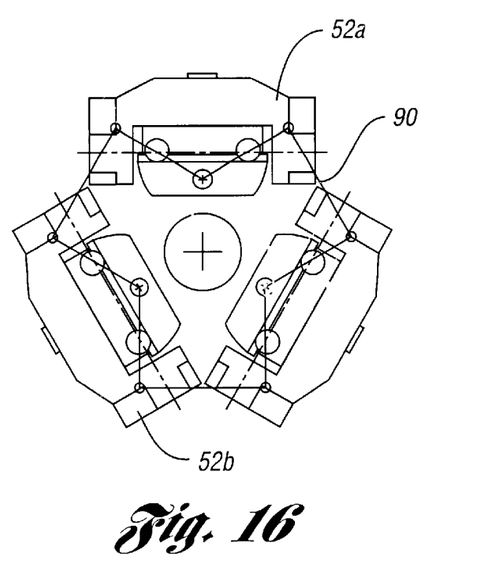
FIG. 16 shows a linkage arrangement for achieving synchronization of the angular adjustment of the gimbals of the angular offset design of the invention.
Figure 17:
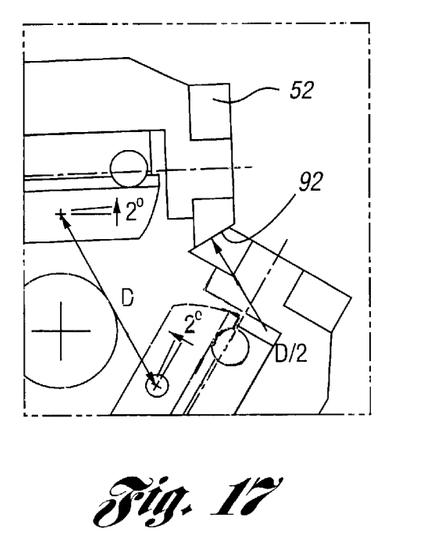
FIG. 17 shows details of the cam interface for a two-degree offset for the cam arrangement of FIG. 15.

Alternative methods may be used to achieve steering synchronization. A first steering synchronizing structure is shown in FIG. 14. This comprises cables 88 that interconnect the gimbal supports as it is wrapped around a semicircular portion of the support. In the alternative, a series of hinged linkage elements, shown at 90 in FIG. 16, could be attached between the gimbal frames at 120° intervals in the case of a design having three rollers. Still another design approach would use cams, as shown at 92 on each gimbal frame, which would contact along lines of symmetry between the frames at a radius of D/2 for two of three rollers. Each trunnion could be fitted with its own controller, but a synchronization mechanism of the kind generally described here could be used to actuate a number of slave cylinders in response to controlled movement of a single master roller, as in the schematic illustration of FIG. 6a. Note that in the steering synchronizers of FIGS. 15 and 16, one of the synchronizing elements is redundant and may be removed.

Figure 18:
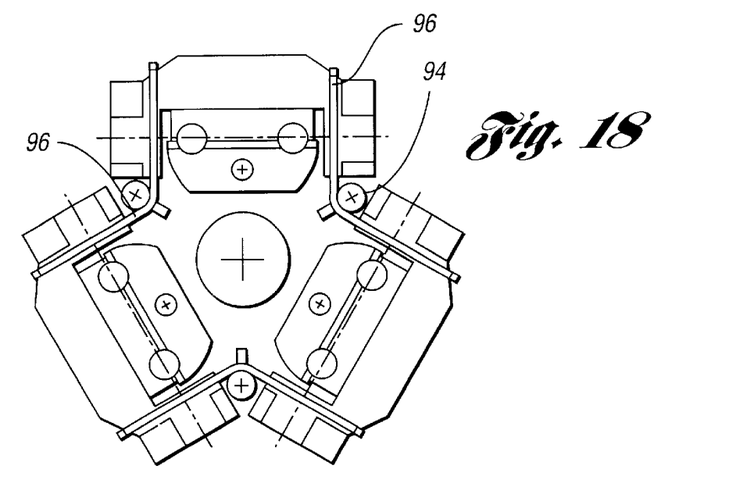
FIG. 18 shows a cable assembly for achieving ratio synchronization of the rollers of the angular offset design of the invention.
Figure 18A:
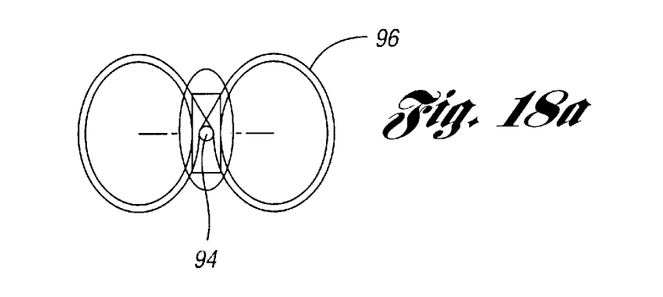
FIG. 18a is a bottom view of the structure of FIG. 18.

In order to ensure that the rollers will seek the same ratio, a separate ratio synchronization mechanism can be used. Two alternative methods can be used to accomplish this. A cable design for accomplishing ratio synchronization is shown in FIG. 18a. In this method, cables are wrapped around the trunnions in a "figure 8" pattern, as seen in FIG. 18 and in FIG. 18a. Keys of the cables may engage oversized slots in the trunnions so that rotational freedom (backlash) is provided up to a required threshold. Guideposts or rollers are provided to route the cable through a 60° angle between the trunnions as shown at 94 in FIG. 18. The cable of the design of FIG. 18 is shown at 96.

Figure 19:
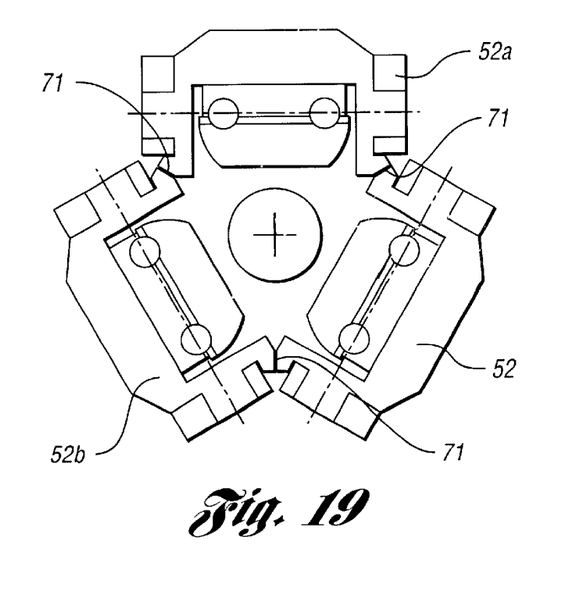
FIG. 19 is a schematic illustration of a bevel gear mechanism for synchronizing the ratio of the three-roller design of the invention.
Figure 19A:
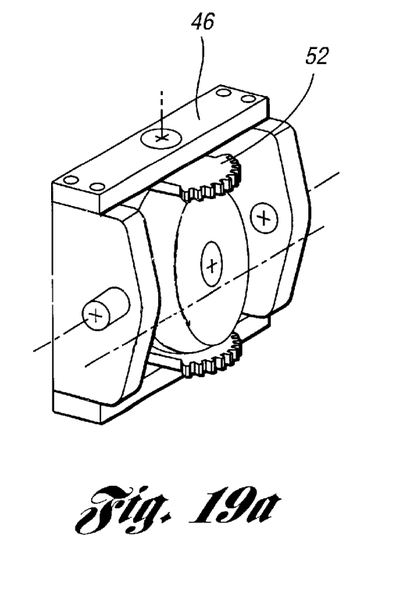
FIG. 19a is a schematic representation of the bevel gear synchronizer arrangement of FIG. 19.

A second ratio synchronization technique is illustrated schematically in FIGS. 19 and 19a. This design uses bevel gears 70, previously described with reference to FIG. 6a. Bevel gear teeth are formed on each trunnion at 120° angles in the case of a design having three rollers for each toroidal cavity.

If the bevel gear design of FIGS. 19 and 19a were to be used, backlash in the gears, of necessity, would change when the inclination of the gimbals takes place. The gear profiles must be displaced, one with respect to the other, to accommodate the inclination of the gimbals. As a consequence, the backlash between the bevel gear teeth is reduced.

In order to avoid binding between the teeth due to extreme gear displacement, the amount of the backlash for a given displacement should be taken into account. This displacement "C" can be calculated from the geometry illustrated in FIGS. 20a and 20b as follows:

$$C = B - 2\delta_y \tan\left[\frac{\theta_i}{2}\right]$$

Figures 20, 20A, 20B:
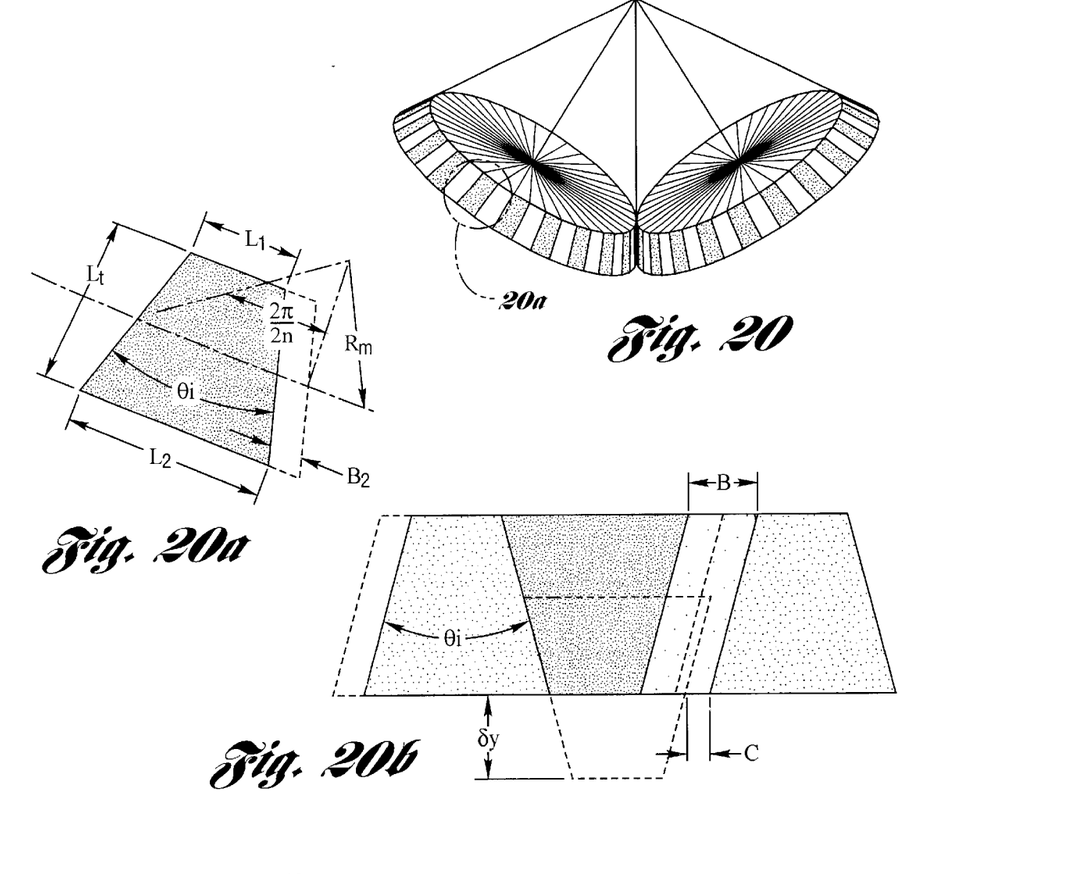
Figure 21:
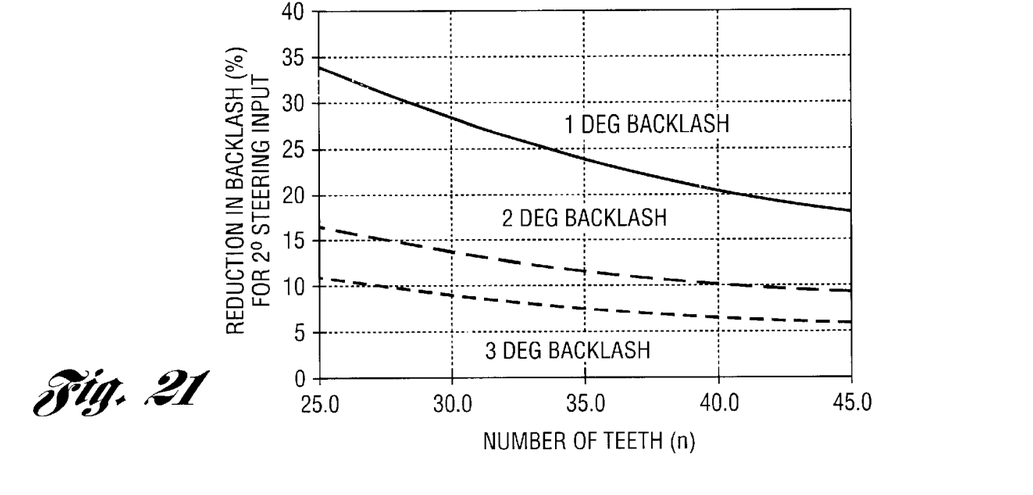
FIG. 21 is a plot of three examples of reduction in backlash for the bevel gear ratio synchronizer arrangement of FIG. 20 versus the number of teeth in the bevel gears.

The terms used in the preceding equation are identified in FIGS. 20, 20a and 20b, where B is the ideal backlash at zero displacement, $\delta_y$ is the gear displacement(function of steering angle), $\theta_s$, and average pitch radius $R_m$) and $\theta_i$ is the included angle (function of number of teeth, average pitch radius, $R_m$, and the ideal backlash). For example, if the gimbal is inclined 2°, the backlash can be reduced by up to 34% for a system having an ideal backlash of 1° and up to 11% for a system having an ideal backlash of 3° based on the minimum teeth recommended for 42 mm bevel gears. This is illustrated in FIG. 21. The variation of backlash as a function of angular offset is also reduced by increasing the number of teeth. Thus, for a given geometry, a higher degree of backlash can be provided with a minimal variation using bevel gears.

Although an embodiment of the invention has been described, it will be apparent to persons skilled in the art that modifications may be made without departing from the scope of the invention. All such modifications and equivalents thereof are intended to be included within the scope of the following claims.

What is claimed:

1. A traction drive comprising a torque input disc and a torque output disc, the discs having semi-toroidal surfaces disposed in juxtaposed relationship on a common rotary axis, one with respect to the other, to define a semi-toroidal cavity;

torque-transmitting rollers located in the semi-toroidal cavity;

the rollers contacting each disc surface at a torque-transmitting contact patch;

a trunnion rotatably supporting each roller for rotation about a roller axis;

a gimbal frame rotatably supported for adjustment about a gimbal frame axis parallel to the common rotary axis of the discs;

each trunnion being supported on a separate gimbal frame for rotary adjustment about a trunnion axis transversely disposed relative to the common rotary axis;

a fixed gimbal support for supporting each disc and the gimbal frame; and means for rotatably adjusting the gimbal frame angularly about the gimbal frame axis whereby the roller supported on each trunnion rotates in an angularly offset plane, thereby creating a roller steering moment that acts on the roller to tilt the roller to a new ratio position;

means for drivably connecting together the trunnions for the rollers whereby angular adjustment of one roller under the influence of the steering moment acting thereon is duplicated with corresponding angular adjustment of another roller to achieve ratio synchronism; the gimbal frame of one roller being drivably connected to the gimbal frame of another roller whereby the one roller is tilted about its trunnion axis in steering synchronism with corresponding tilting movement of another roller.

2. A traction drive comprising a torque input disc and a torque output disc, the discs having semi-toroidal surfaces disposed in juxtaposed relationship on a common rotary axis, one with respect to the other, to define a semi-toroidal cavity;

torque-transmitting rollers located in the semi-toroidal cavity;

the rollers contacting each disc surface at a torque-transmitting contact patch;

a trunnion rotatably supporting each roller for rotation about a roller axis;

a gimbal frame rotatably supported for adjustment about a gimbal frame axis parallel to the common rotary axis of the discs;

each trunnion being supported on the gimbal frame for rotary adjustment about a trunnion axis transversely disposed relative to the common rotary axis;

a fixed gimbal support for supporting each disc and the gimbal frame; and means for rotatably adjusting the gimbal frame angularly about the gimbal frame axis whereby the roller supported on the trunnion rotates in an angularly offset plane, thereby creating a roller steering moment that acts on the roller to tilt the roller to a new ratio position;

a pair of rollers being located in the semi-toroidal cavity, the rollers being mounted on separate trunnions on opposite lateral sides of the rotary disc axis wherein a steering moment adjusts each roller to a new ratio position through a steering angle that is expressed as:

$$\theta_s = \Delta\theta + \tan^{-1}\left[\frac{\sin(\Delta\theta)(R_{axis} - R_c)}{R_c}\right]$$

where $\Delta\theta$ is the angular offset, $R_c$ is the radius from the common rotary disc axis to the point of contact of the disc and the roller, and $R_{axis}$ is the radius for the common rotary disc axis to the gimbal frame axis.

3. A traction drive comprising a torque input disc and a torque output disc, the discs having semi-toroidal surfaces disposed in juxtaposed relationship on a common rotary axis, one with respect to the other, to define a semi-toroidal cavity;

torque-transmitting rollers located in the semi-toroidal cavity;

the rollers contacting each disc surface at a torque-transmitting contact patch;

a trunnion rotatably supporting each roller for rotation about a roller axis;

a gimbal frame rotatably supported for adjustment about a gimbal frame axis parallel to the common rotary axis;

each trunnion being supported on the gimbal frame for rotary adjustment about a trunnion axis transversely disposed relative to the common rotary axis;

a fixed gimbal support for supporting each disc and the gimbal frame; and means for rotatably adjusting the gimbal frame angularly about the gimbal frame axis whereby the roller supported on the trunnion rotates in an angularly offset plane, thereby creating a roller steering moment that acts on the roller to tilt the roller to a new ratio position;

the rollers in the semi-toroidal cavity being disposed at 120° angular intervals about the rotary axis of the discs whereby three rollers between the discs transfer torque between the discs wherein a steering moment adjusts each roller to a new ratio position through a steering angle that is expressed as:

$$\theta_s = \Delta\theta + \tan^{-1}\left[\frac{\sin(\Delta\theta)(R_{axis} - R_c)}{R_c}\right]$$

where $\Delta\theta$ is the angular offset, $R_c$ is the radius from the common rotary disc axis to the point of contact of the disc and the roller, and $R_{axis}$ is the radius for the common rotary disc axis to the gimbal frame axis.

4. A traction drive comprising a torque input disc and a torque output disc, the discs having semi-toroidal surfaces disposed in juxtaposed relationship on a common rotary axis, one with respect to the other, to define a semi-toroidal cavity;

torque-transmitting rollers located in the semi-toroidal cavity;

the rollers contacting each disc surface at a torque-transmitting contact patch;

a trunnion rotatably supporting each roller for rotation about a roller axis;

a gimbal frame rotatably supported for adjustment about a gimbal frame axis parallel to the common rotary axis;

each trunnion being supported on a separate gimbal frame for rotary adjustment about a trunnion axis transversely disposed relative to the common rotary axis;

a fixed gimbal support for supporting each disc and the gimbal frame; and means for rotatably adjusting the gimbal frame angularly about the gimbal frame axis whereby the roller supported on each trunnion rotates in an angularly offset plane, thereby creating a roller steering moment that acts on the roller to tilt the roller to a new ratio position;

means for drivably connecting together the trunnions for the rollers whereby angular adjustment of one roller under the influence of the steering moment acting thereon is duplicated with corresponding angular adjustment of another roller to achieve ratio synchronism;

the gimbal frame of one roller being drivably connected to the gimbal frame of another roller whereby the one roller is tilted about its trunnion axis in steering synchronism with corresponding tilting movement of another roller wherein the driveable connections between the gimbal frames includes a direct-driving element between the gimbal frames whereby adjustment of one gimbal frame effects movement of another gimbal frame with synchronous steering adjustments.

5. A traction drive comprising a torque input disc and a torque output disc, the discs having semi-toroidal surfaces disposed in juxtaposed relationship on a common rotary axis, one with respect to the other, to define a semi-toroidal cavity;

torque-transmitting rollers located in the semi-toroidal cavity;

the rollers contacting each disc surface at a torque-transmitting contact patch;

a trunnion rotatably supporting each roller for rotation about a roller axis;

a gimbal frame rotatably supported for adjustment about a gimbal frame axis parallel to the common rotary axis;

each trunnion being supported on a separate gimbal frame for rotary adjustment about a trunnion axis transversely disposed relative to the common rotary axis;

a fixed gimbal support for supporting each disc and the gimbal frame; and means for rotatably adjusting the gimbal frame angularly about the gimbal frame axis whereby the roller supported on each trunnion rotates in an angularly offset plane, thereby creating a roller steering moment that acts on the roller to tilt the roller to a new ratio position;

means for drivably connecting together the trunnions for the rollers whereby angular adjustment of one roller under the influence of the steering moment acting thereon is duplicated with corresponding angular adjustment of another roller to achieve ratio synchronism; the means for drivably connecting the trunnions including a direct mechanical drive connecting the trunnions for simultaneous synchronous roller movement; wherein the direct mechanical drive includes meshing gear teeth carried by each trunnion whereby the trunnions move rotatably in synchronism about their respective axes when one trunnion is adjusted angularly about its axis.

6. A traction drive comprising a torque input disc and a torque output disc, the discs having semi-toroidal surfaces disposed in juxtaposed relationship on a common rotary axis, one with respect to the other, to define a semi-toroidal cavity;

torque-transmitting rollers located in the semi-toroidal cavity;

the rollers contacting each disc surface at a torque-transmitting contact patch;

a trunnion rotatably supporting each roller for rotation about a roller axis;

a gimbal frame rotatably supported for adjustment about a gimbal frame axis parallel to the common rotary axis;

each trunnion being supported on a separate gimbal frame for rotary adjustment about a trunnion axis transversely disposed relative to the common rotary axis;

a fixed gimbal support for supporting each disc and the gimbal frame; and means for rotatably adjusting the gimbal frame angularly about the gimbal frame axis whereby the roller supported on each trunnion rotates in an angularly offset plane, thereby creating a roller steering moment that acts on the roller to tilt the roller to a new ratio position;

means for drivably connecting together the trunnions for the rollers whereby angular adjustment of one roller under the influence of the steering moment acting thereon is duplicated with corresponding angular adjustment of another roller to achieve ratio synchronism;

the means for drivably connecting the trunnions including a direct mechanical drive connecting the trunnions for simultaneous synchronous roller movement wherein the direct mechanical drive includes meshing gear teeth carried by each trunnion whereby the trunnions move rotatably in synchronism about their respective axes when one trunnion is adjusted angularly about its axis wherein the meshing gear teeth are helical gear teeth, the helical gears having registering gear tooth surfaces that define a cam profile, the gear teeth having a backlash therebetween that is a function of the angular offset of the offset plane of the gimbal frame to avoid binding of the teeth as the teeth are relatively displaced due to the offset, the degree of backlash that can be accommodated thereby being increased.

7. A traction drive comprising a torque input disc and a torque output disc, the discs having semi-toroidal surfaces disposed in juxtaposed relationship on a common rotary axis, one with respect to the other, to define a semi-toroidal cavity;

torque-transmitting rollers located in the semi-toroidal cavity;

the rollers contacting each disc surface at a torque-transmitting contact patch;

a trunnion rotatably supporting each roller for rotation about a roller axis;

a gimbal frame rotatably supported for adjustment about a gimbal frame axis parallel to the common disc axis;

each trunnion being supported on a separate gimbal frame for rotary adjustment about a trunnion axis transversely disposed relative to the common disc axis;

a fixed gimbal support for supporting each disc and the gimbal frame; and means for rotatably adjusting the gimbal frame angularly about the gimbal frame axis whereby the roller supported on each trunnion rotates in an angularly offset plane, thereby creating a roller steering moment that acts on the roller to tilt the roller to a new ratio position; and means for drivably connecting together the trunnions for the rollers whereby angular adjustment of one roller under the influence of the steering moment acting thereon is duplicated with corresponding angular adjustment of another roller to achieve ratio synchronism the roller, in its new ratio position, creating trunnion friction forces with a non-zero angular offset of the gimbal frame, the means for rotatably adjusting the gimbal frame angularly comprising a feedback control for returning the inclination angle of the gimbal frame to zero based upon the angular disposition of the gimbal frame relative to the gimbal support whereby efficiency of the traction drive is improved.

\* \* \* \* \*